May 4, 1943.  W. R. CLARK  2,318,197
VISUAL INDICATOR
Filed May 5, 1942
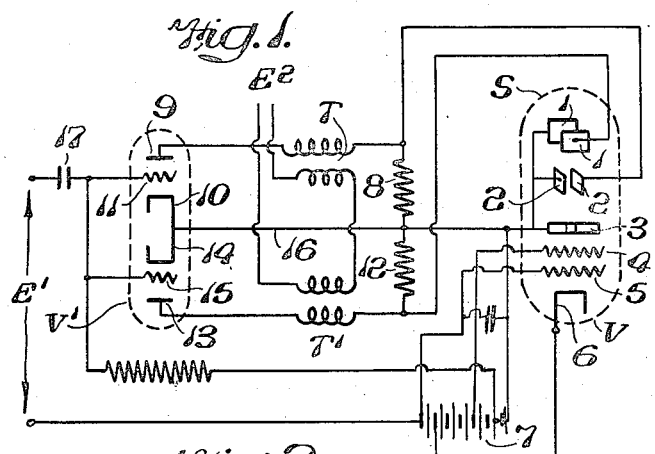
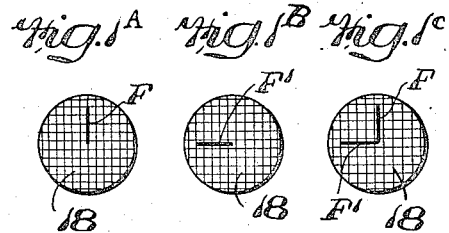
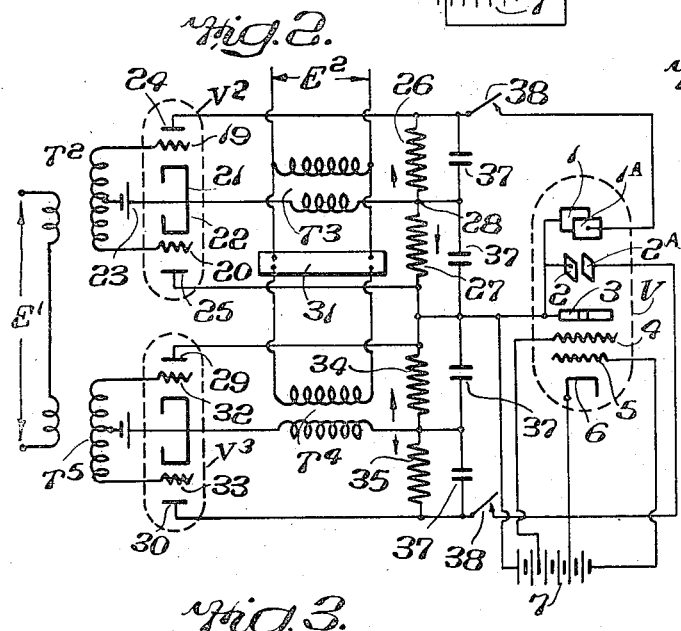
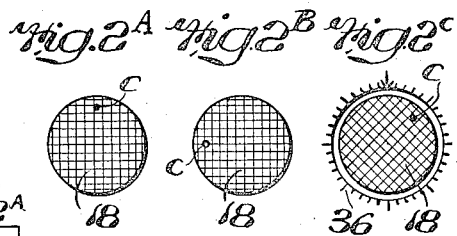
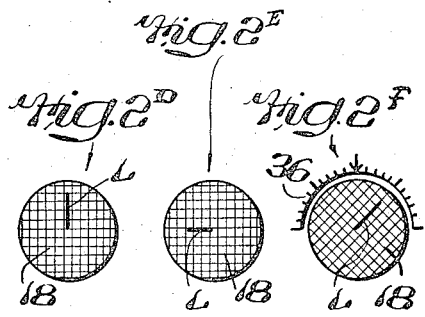
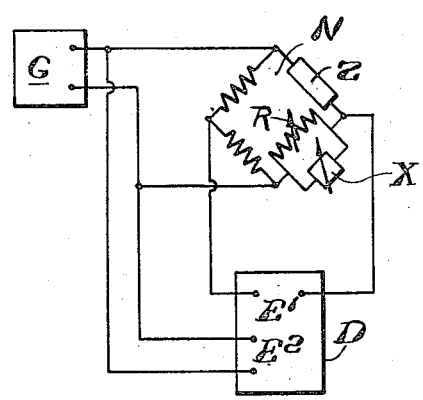
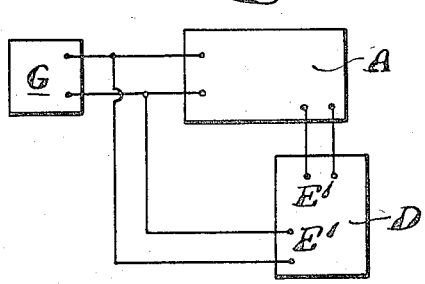
INVENTOR.
William Russell Clark
By C. L. Ehret
ATTORNEY Patented May 4, 1943

2,318,197

UNITED STATES PATENT OFFICE 2,318,197

VISUAL INDICATOR

William Russell Clark, Abington, Pa., assignor to Leeds and Northrup Company, Philadelphia, Pa., a corporation of Pennsylvania Application May 5, 1942, Serial No. 441,823

11 Claims. (Cl. 172—245)

My invention relates to systems for indicating the magnitude of an alternating voltage and/or the phase relation thereof to another alternating voltage of the same frequency; more particularly, it concerns systems for visually indicating the sense and extent of unbalance of alternating-current measuring networks or for visually indicating the phase difference between input and output voltages of amplifiers, attenuators, and other electrical devices, systems and circuits.

In accordance with my invention, the excitation of the deflection plates or equivalent deflection means of a cathode-ray tube is determined by a rectifier system, including grid-controlled rectifiers, upon whose input or grid circuit is impressed one of aforesaid alternating voltages and upon whose anode circuit is impressed the other of said voltages; more particularly, in one modification of my invention utilizing a pair of rectifiers, the extents of excitation of each pair of deflection plates, or equivalent, are determined by the phase relations of the grid and anode potentials of one of the rectifiers, whereas in another modification of my invention utilizing two pairs of rectifiers, the poling and magnitude of the voltage applied to each pair of deflection plates, or equivalent deflection means, is controlled by one of the pairs of rectifiers in accordance with the phase relations of the potentials of their grids and anodes.

My invention further resides in indicating systems having the features of combination and arrangement hereinafter described and claimed.

For an understanding of my invention, reference is made to the accompanying drawing, in which:

Figs. 1 and 2 diagrammatically illustrate the various components and their connections of two systems embodying this invention;

Figs. 1A–1C and Figs. 2A–2F disclose cathode-ray images referred to in description of the operation of Figs. 1 and 2;

Figs. 3 and 4 schematically illustrate systems in which may be included the indicating systems of Figs. 1 and 2.

Referring to Fig. 1, the tube V is a cathode-ray tube of suitable type, for example, an R. C. A. 906, having the usual complement of electrodes comprising two pairs of ray-deflecting plates (1, 1 and 2, 2), anode 3, focusing and intensity grids 4, 5, and cathode 6. The operating potentials of the anode 3, and of grids 4 and 5 may be derived from any suitable source or sources generically represented by battery 7.

The difference of potential applied to deflection plates 1, 1 is derived from flow of undirectional current through resistor 8 of suitably high magnitude, for example 50,000 ohms, in the output or anode circuit of the grid-controlled rectifier comprising anode 9, cathode 10 and grid 11. The difference of potential applied to the other pair of deflection plates 2, 2 is derived from flow of unidirectional current through resistor 12, substantially equal in magnitude of resistance to resistor 8, in the output circuit of the grid-controlled rectifier comprising anode 13, cathode 14 and grid 15. The two rectifiers may be disposed in a single envelope as V1 and constitute a structural unit, for example a tube of the 6N7 type, or they may be disposed in separate envelopes.

The return connection 16 common to the rectifier cathodes connects them to the common terminal of resistances 8 and 12 and of the two sets of deflection plates.

The voltage E2 is so impressed upon the anode circuits of the rectifiers, as by selection of proper poling of the windings of transformers T and T1, that the alternating potentials of the rectifier anodes 9 and 13 are in 180° phase relation. The voltage-ratio of the transformers T and T1 is preferably such the maximum potentials of the anodes 9 and 13 are equal.

The grids 11, 15 of the rectifiers are connected through resistance of suitably high magnitude, for example 250,000 ohms, to a point somewhat negative with respect to the cathodes 10, 14; the grids are also connected through a blocking condenser 17 to one terminal of a source of alternating voltage E1 whose other terminal, insofar as alternating potentials are concerned, is connected to the rectifier cathodes.

Assuming a typical orientation of tube V and poling of transformers T and T1, when the alternating voltages E1 and E2 are in phase, the grid 11 is positive throughout the half-waves of voltage E2 for which anode 9 is positive and consequently current flows through resistance 8; the electrostatic field produced between plates 1, 1 by the varying voltage developed across resistance 8 by the pulses of anode current deflects the cathode-ray so that the figure F, Fig. 1A, recurrently traced by the cathode spot upon the fluorescent screen S of the tube V is a vertical line. When the alternating voltages E1 and E2 are in phase, grid 15 is positive only when anode 13 is negative and consequently for this phase relation, no current traverses resistance 12 and the plates 2, 2 are without effect upon the position of the cathode-spot.

When, on the other hand, the alternating voltages E1 and E2 are in phase opposition, 180° out of phase, the phase relations of the potentials of the grids and anodes of the rectifiers are reversed; that is, the grid 15 is positive for the half cycles for which anode 13 is positive and grid 11 is positive only while anode 13 is negative. Consequently only resistance 12 is traversed by pulses of rectified or unidirectional current and plates 2, 2 effect horizontal deflection of the cathode-ray, Fig. 1B, so that the cathode spot recurrently traces a horizontal line F1.

Because under each of the foregoing circumstances the magnitude of current traversing resistance 8 or 12 is a function of the magnitude of alternating voltage E1, the extent or length of line F or F1 is a measure of the voltage E1 and its magnitude can be read directly from or by reference to the checkered scale 18 marked upon the tube or upon a transparent sheet disposed in front of it.

For other phase relations of voltages E1 and E2, each of the grids 11 and 15 will be positive for a fraction of the half cycles for which its associated anode 9 or 13 is positive and consequently both of resistances 8 and 12 will be traversed by pulses of current. Accordingly, the cathode beam is affected by both sets of deflection plates for each cycle of voltage E2 and the figure recurrently traced by the cathode-spot comprises both a horizontal line F1 and a vertical line F. The relative lengths of the lines F and F1 depends upon the phase relation of E1 and E2; when, for example, they are in quadrature, 90° out of phase, the horizontal and vertical lines are of equal length.

In the modification shown in Fig. 2, the voltage E1 is applied to the grids of two pairs of rectifiers so that the alternating potentials of the grids of each pair are in phase opposition. One pair of rectifiers controls the relative polarity and magnitude of potential difference between one set of deflection plates of a cathode-ray tube and the other pair of rectifiers similarly controls the other set of deflection plates. The voltage E2 is so applied that the alternating potentials of the anodes of each pair of rectifiers are in phase with each other but in quadrature to anode potentials of the other pair of rectifiers.

More particularly, the grids 19 and 20 of the twin rectifier tube V2 are connected to opposite secondary terminals of transformer T2 whose primary is traversed by current from the source of voltage E1. The mid-tap of the secondary winding is connected to the cathode structure 21, 22 of tube V2 preferably through a grid-biasing battery 23 or equivalent.

The secondary winding of transformer T3 is included in the common cathode return circuit of the anodes 24 and 25 so that their alternating potentials are in phase. When the phase relations of E1 and E2 are such that grid 19 is positive throughout the half-waves of E2 for which anode 24 is positive current flows through resistance 26 in the direction indicated so that plate 1A throughout those half waves is negative with respect to its companion plate 1; on the other hand, when the phase relations of E1 and E2 are such that grid 20 is positive throughout the half-waves of E2 for which anode 25 is positive, current flows, during those half-waves, through resistance 27 in the direction indicated and plate 1A is therefore positive with respect to plate 1.

Consequently in one case the spot is deflected upwardly by plates 1, 1A, Fig. 2A, and in the other case is deflected downwardly; in both cases without horizontal displacement.

The condensers 37 individually in shunt to the rectifier load resistors 26, 27 are of suitably large magnitude, for example two microfarads, to ensure steadiness of the spot C so long as E1 remains fixed, in magnitude and phase relation, with respect to E2; more generally the time constant of each of the combinations 26, 37 and 27, 37 is suitably greater than the period of a half-wave of E1, or E2.

For other phase relations of E1 and E2, both grids 19 and 20 are positive for a fraction of each of the half-cycles of E2 for which their associated anodes are positive and therefore current flows in each half-cycle through both of the resistances 26 and 27. Whether the cathode spot assumes a position above or below the null position depends upon which of the two voltages produced across resistance 26 and 27 is the greater; as hereinafter appears, there is also horizontal displacement.

The relative polarity of the horizontal deflection plates 2, 2A is similarly controlled by a second pair of grid-controlled rectifiers conveniently disposed within the single tube V3. The secondary winding of transformer T4 is included in the common cathode return circuit of the anodes 29 and 30 so that their alternating potentials are in phase with each other, the phase shifter 31 however providing that their potentials are in quadrature with the potentials of anodes 24 and 25 of tube V2.

The grids 32, 33 of tube V3 are connected to opposite secondary terminals of transformer T5 upon whose primary is impressed voltage E1. The potentials of grids 32 and 33 are in phase opposition to each other but one is in phase with the potential of grid 19 of tube V2 and the other in phase with the potential of grid 20 of tube V2.

When grid 32 is positive throughout the half-cycles of E2 for which its associated anode 29 is positive, current flows, throughout such half-cycles, through resistor 34 to cause the cathode-spot to move in one direction horizontally, Fig. 2B, from its null position whereas when grid 33 is positive throughout the positive half-cycles of the potential of its associated anode 30, current flows, throughout such half-cycle through the resistor 35 with the result the cathode spot moves horizontally to the other side of its null position. For other phase relations of the potentials of the anodes 29, 30 and grids 32, 33 both resistors 34 and 35 are traversed by current in each half cycle and the difference of the voltage drops across them determines the relative polarity of deflection plates 2, 2A and the magnitude of their potential difference; accordingly the cathode-spot moves to the left or right of its null position as well as up or down; the condensers 37, 37 in shunt to resistors 34, 35 ensuring steadiness of the cathode spot.

Considering the system of Fig. 2 as a whole or the joint effect of the two rectifier systems upon the position of the cathode spot C, in all cases except when the phase relations of E1 and E2 are such that the potential of one of the grids 19, 20, 32 and 33 is in phase with the potential of its associated anode, the cathode spot is deflected both vertically and horizontally from its null position to a position uniquely representative of the existing phase relation of E1 and E2 and of the magnitude of E1; Fig. 2C is illustrative of one case and as there indicated the scale 18 may be rotated relative to the tube screen and to a fixed scale 36 for indication of the phase angle and magnitude of E1.

By periodically interrupting the input or output circuits of tubes V2 and V3 in any suitable manner, as by a rotating commutator, electronic switch or the like, the image on the screen of tube V instead of being a spot as in Figs. 2A–C is a line or spot-trade L, Figs. 3D–F, having its starting or pivot end at the center or zero input position of the cathode spot, of length corresponding with the magnitude of voltage E1 and of angular position indicative of the phase relation of voltages E1 and E2. Such various means for interrupting the output circuits of tubes V2 and V3 are generically comprehended by the switches 38; they may if desired be disposed in the common anode return paths to the cathodes of tube V2 and V3 or in any other location, as in series with E1, controlling application of voltage to the deflection plates of tube V. For convenience of reading of the phase angle, the scale 18 may be rotatable, Fig. 2F.

As typical of a measuring system with which either of the indicating systems of Fig. 1 or 2 may be used to detect and visually indicate unbalance, reference is made to Fig. 3, in which the network N, generically representative of a balanceable network, is a Maxwell bridge including the unknown impedance Z in one of its arms and in another of its arms the resistance R, adjustable to balance the "in-phase" component of impedance Z, and the reactance X, inductive or capacitative as required, adjustable to balance the "out-of-phase" component of impedance Z.

The unbalance voltage of the bridge is applied as voltage E1 to the grid circuit of Fig. 1 or Fig. 2, both generically represented by rectangle D. The signal generator G, or other source of alternating current such as a 60 cycle power line, provides the network N with its energizing current and preferably also supplies the phase-reference voltage E2 for the rectifier anode circuits, Figs. 1 and 2.

If, for increased sensitivity, an amplifier is interposed between the bridge N and the detector D, it either should be free of phase shift for the frequency or frequencies at which the bridge is used or its phase shift should be compensated by any suitable frequency-calibrated phase-shifting device or network interposed between the bridge N and the detector D or signal generator G or between the latter and detector D; alternatively the tube may be re-oriented or the scale 36 may be shifted in compensation for the phase-shift of the amplifier.

As typical of the use of either of the systems of Fig. 1 or 2 to measure the phase difference of the input and output voltages E1 and E2 of an amplifier, attenuator, transformer or other similar device A, reference is made to Fig. 4. One of the voltages, preferably the input voltage E1 from a signal generator G or other source of alternating current, is applied to the grid circuit of the detector D and the other of the voltages is impressed upon the anode circuit. The difference in phase of the input and output voltage of device A is visually indicated by the cathode-ray tube for reasons apparent from the foregoing explanation of the operation of the systems of Figs. 1 and 2.

Use of the indicating systems of Figs. 1 and 2 is not limited to such applications, Figs. 3 and 4; many others will readily suggest themselves to those skilled in the art.

When the cathode-ray tube is of the electromagnetic deflection type using deflection coils instead of deflection plates only slight changes in the systems of Figs. 1 and 2 are necessary. In Fig. 1, the resistors 8 and 12 are replaced respectively by the vertical and horizontal deflection coils. In Fig. 2, the resistors 26, 27 are replaced by a mid-tapped vertical deflection coil having its tap connected to the cathode structure of tube V2 and resistors 34, 35 are similarly replaced by a mid-tapped horizontal deflection coil.

In modification of the system of Fig. 2 or its equivalent, the voltage E1 may be so applied that the two grids of each tube V2, V3 are at a common potential, i. e. so that grids 19 and 20 are at the same potential and grids 32 and 33 are at the same potential. In such modification, as by the transformer arrangement T, T1, of Fig. 1, the potentials of anodes 24 and 25 are 180° out of phase and by a similar arrangement, the potentials of anodes 29 and 30 are 180° out of phase. The potential of anodes 24, 25 should be 90° out of phase with respect to the potential of anodes 29, 30 or alternatively the secondary windings for the pairs of grids 19, 20 and 32, 32 may be so poled and interconnected by a phase-shifting device or network that the potential of grids 19, 20 is 90° out of phase with respect to the potential of grids 32, 33.

With such modification, the phase relation of voltages E1, E2 and the magnitude of voltage E1 will be indicated by the position of the cathode spot, Figs. 2A–2C, if the application of the voltages is continuous or by the trace of the cathode spot, Figs. 2D–2F, if the application of one of the voltages is intermittently interrupted or controlled as above described by a commutator, electronic switch, or equivalent.

The system of Fig. 2 and the above described modification thereof have the characteristic of being affected by the presence of harmonics only to the extent such harmonics are present both in E1 and E2. This is of particular advantage when the detector is used with balanceable networks, for example bridges, whose balance is not independent of frequency for in such cases the presence of harmonics in the detector arm or branch of the network may either cause false indication of balance or prevent an indication of balance depending upon the type of the network.

The systems herein disclosed and claimed accomplish results and serve purposes of specifically different systems disclosed in my co-pending application Serial No. 436,829 filed March 30, 1942.

What I claim is:

1. A system for visually indicating the phase relation between two alternating voltages of the same frequency and/or the magnitude of one of them which comprises a cathode-ray tube having at least one means for deflecting the cathode-ray, a rectifier system including a controlled rectifier, means for impressing said voltages upon the grid and anode circuits respectively of said rectifier system, and means for energizing said deflection means in accordance with the resulting unidirectional current in the anode circuit of said rectifier system.

2. A system for visually indicating the phase relation between two alternating voltages of the same frequency and/or the magnitude of one of them which comprises a cathode-ray tube having at least one means for deflecting the cathode-ray, a rectifier system including at least one pair of grid-controlled rectifiers, means for applying one of said voltages to effect in-phase variations of the grid potentials of a pair of said rectifiers, means for applying the other of said voltages to effect out-of-phase variations of the potentials of the rectifier anodes associated with said grids, and means for exciting said deflection means in a sense and to an extent dependent upon the resulting anode currents of said rectifiers.

3. A system for visually indicating the phase relation between two alternating voltages of the same frequency and/or the magnitude of one of them which comprises a cathode-ray tube having two means for deflecting the cathode-ray, a rectifier system including grid-controlled rectifiers, means for impressing said alternating voltages respectively upon the grid and anode circuits of said rectifiers, and means for exciting said two deflecting means respectively in accordance with the anode currents of said rectifiers.

4. A system for visually indicating the phase relation between two alternating voltages of the same frequency and/or the magnitude of one of them which comprises a cathode-ray tube having two means for deflecting the cathode-ray, a pair of grid controlled rectifiers, means for applying one of said alternating voltages to effect in-phase variations of the grid potentials of said rectifiers, means for applying the other of said voltages to effect out-of-phase variations of the anode potentials of said rectifiers, and means for exciting each of said deflecting means in accordance with the anode current of one of said rectifiers.

5. A system for visually indicating the phase relation between two alternating voltages of the same frequency and/or the magnitude of one of them which comprises a cathode-ray tube having two means for deflecting the cathode-ray, a rectifier system including two pairs of grid-controlled rectifiers, means for applying one of said alternating voltages to effect in-phase variations of the grid potentials of said rectifiers, means for applying the other of said voltages to effect variation, in quadrature phase relation, of the anode potentials of said rectifiers, and means for controlling the excitation of each of said deflecting means in accordance with the resultant of the opposed anode currents of one of said pairs of rectifiers.

6. A system for visually indicating the phase relation between two alternating voltages of the same frequency and/or the magnitude of one of them which comprises a cathode-ray tube having at least one pair of deflection plates, a rectifier system including a grid-controlled rectifier, means for impressing one of said alternating voltages upon the grid circuit of said rectifier system, means for impressing the other of said alternating voltages upon the anode circuit of said rectifier system, and means for deriving from the resulting unidirectional current in the anode circuit of said rectifier system a voltage applied to said pair of deflection plates.

7. A system for visually indicating the phase relation between two alternating voltages of the same frequency and/or the magnitude of one of them which comprises a cathode-ray tube having at least one pair of deflection plates, a rectifier system including at least one pair of grid-controlled rectifiers, means for applying one of said alternating voltages to effect in-phase variations of the potentials of the grids of a pair of said rectifiers, means for applying the other of said alternating voltages to effect out-of-phase variations of the potentials of the rectifier anodes associated with said grids, and means for deriving from the anode currents and applying to said pair of deflection plates a difference of potential whose polarity and magnitude are dependent upon the phase relations of the potentials of the grids and anodes of said pair of rectifiers.

8. A system for visually indicating the phase relation between two alternating voltages of the same frequency and/or the magnitude of one of them which comprises a cathode-ray tube having two pairs of deflection plates, a rectifier system including grid-controlled rectifiers, means for impressing one of said alternating voltages upon the grid circuit of said rectifier system, means for impressing the other of said alternating voltages upon the anode circuit of said rectifier system, and means for deriving from uni-directional currents in the anode circuit of said rectifier system the operating voltages of said two sets of deflection plates.

9. A system for visually indicating the phase relation between two alternating voltages of the same frequency and/or the magnitude of one of them which comprises a cathode-ray tube having two pairs of deflection plates, a rectifier system, a pair of grid-controlled rectifiers, means for applying one of said alternating voltages to effect in-phase variations of the grid-potentials of said rectifiers, means for applying the other of said voltages to effect out-of-phase variations of the anode-potentials of said rectifiers, means for controlling the potential difference between one pair of deflection plates in accordance with the current traversing the anode circuit of one of said rectifiers, and means for controlling the potential difference between the other pair of deflection plates in accordance with the current traversing the anode circuit of the other of said rectifiers.

10. A system for visually indicating the phase relation between two alternating voltages of the some frequency and/or the magnitude of one of them which comprises a cathode-ray tube having two pairs of deflection plates, a rectifier system including two pairs of grid-controlled rectifiers, means for applying one of said alternating voltages to effect in-phase variations of the grid-potentials of said rectifiers, means for applying the other of said voltages to effect variation, in quadrature phase relation, of the anode potentials of said rectifiers, means for controlling the magnitude and polarity of the potential difference between one pair of deflection plates in accordance with the anode currents of one of said pairs of rectifiers, and means for controlling the magnitude and polarity of the potential difference between the other pair of deflection plates in accordance with the anode currents of the other of said pairs of rectifiers.

11. A system for visually indicating the phase relation between two alternating voltages of the same frequency and/or the magnitude of one of them which comprises a cathode-ray tube having two pairs of deflection plates, a rectifier system including two pairs of grid-controlled rectifiers, means for applying one of said alternating voltages to effect in-phase variations of the grid-potentials of said rectifiers, means for applying the other of said voltages to effect variation, in quadrature phase relation, of the anode potentials of said rectifiers, means for controlling the magnitude and polarity of the potential difference between one pair of deflection plates in accordance with the anode currents of one of said pairs of rectifiers, means for controlling the magnitude and polarity of the potential difference between the other pair of deflection plates in accordance with the anode currents of the other of said pairs of rectifiers, and circuit-interrupting means operated intermittently to cause the cathode-ray spot recurrently to trace an image whose position and size are determined by the potential differences between each of said pairs of deflection plates.

WILLIAM RUSSELL CLARK.

DISCLAIMER 2,318,197.—*William Russell Clark*, Abington, Pa. VISUAL INDICATOR. Patent dated May 4, 1943. Disclaimer filed Sept. 4, 1945, by the assignee, *Leeds and Northrup Company*.

Hereby enters this disclaimer to claims 1, 2, and 6.

[*Official Gazette October 2, 1945.*]

DISCLAIMER 2,318,197.—*William Russell Clark*, Abington, Pa. VISUAL INDICATOR. Patent dated May 4, 1943. Disclaimer filed Sept. 4, 1945, by the assignee, *Leeds and Northrup Company*.

Hereby enters this disclaimer to claims 1, 2, and 6.

[*Official Gazette October 2, 1945*.]